(12) United States Patent
Paine et al.

(10) Patent No.: US 6,211,287 B1
(45) Date of Patent: Apr. 3, 2001

(54) PARTICLE FORMATION PROCESS AND MARKING MATERIALS THEREOF

(75) Inventors: Anthony J. Paine, Mississauga; Alfred Rudin, Toronto, both of (CA); Florin Vlad, White House Station, NJ (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/235,630

(22) Filed: Jan. 22, 1999

Related U.S. Application Data

(62) Division of application No. 08/974,642, filed on Nov. 19, 1997, now Pat. No. 5,902,853.

(51) Int. Cl.$^7$ .............................. C08F 2/22; G03G 9/08; G03G 9/09
(52) U.S. Cl. ...................... 524/804; 524/832; 524/836; 526/79; 430/104; 430/137; 430/904
(58) Field of Search ................... 526/79; 524/804; 430/104, 137, 904

(56) References Cited

U.S. PATENT DOCUMENTS 5,455,315 * 10/1995 Paine ...................................... 526/79

* cited by examiner

*Primary Examiner*—Fred Zitomer
(74) *Attorney, Agent, or Firm*—John L. Haack

(57) ABSTRACT

A process for the preparation of resin particles comprising: adding a mixture of at least one free radical reactive monomer continuously to a heated aqueous solution of a water soluble free radical initiator and a water soluble salt to form latex emulsion particles and aggregates thereof; and wherein the rate of continuous addition of said monomer is greater than the rate at which monomer is consumed by polymerization.

3 Claims, 3 Drawing Sheets

PARTICLE FORMATION PROCESS AND MARKING MATERIALS THEREOF

REFERENCE TO COPENDING APPLICATIONS AND ISSUED PATENTS

This application is divisional of application Ser. No. 08/974,642, filed Nov. 19, 1997, U.S. Pat. No. 5,902,853.

Attention is directed to commonly owned and assigned U.S. Pat. No. 5,455,315, issued Oct. 3, 1995, entitled "Emulsion Polymerization Process and Toners Thereof".

The disclosure of the above mentioned patent is incorporated herein by reference in its entirety.

BACKGROUND OF THE INVENTION

The present invention is generally directed to free radical initiated monomer polymerization processes for the formation of resin particles. More specifically, the present invention is directed to polymerization processes wherein monomer polymerization and particle aggregation can be achieved simultaneously under controlled monomer excess feed or "flood" feed conditions to provide monodisperse resin particles and resin particle aggregates thereof with a volume average diameter size range of, for example, from about 1 to about 10 micrometers.

The composition and processes of the present invention enable, in embodiments: emulsifier free emulsion polymerization processes; monodisperse resin particles or resin particle aggregates within an average diameter size range of, for example, from about 1 to about 3 micrometers; monodisperse resin particles or resin particle aggregates with geometric particle size distributions below about 1.05, for example, of from about 1.01 to about 1.02, and $d_w/d_n$ values less than about 1.01; resin particles and particle aggregates which are suitable for use in dry and liquid developers and toner for printing applications; and resin particles and resin particle aggregates which can be grown, or increased in size if desired, to larger average particle sizes.

There are known methods for directly preparing resin particles from monomers, including dispersion polymerization, encapsulation, emulsion polymerization, and emulsion-aggregation. The product particles generally may be optionally colored during or subsequent to particle formation to afford "in-situ" or "chemical" toners. These methods possess unique advantages and disadvantages including: cost; ease of use; product contamination and purification considerations; environmental and waste concerns; reliability in producing product particles with desired physical or chemical properties, such as particle size range, particle size distribution, color, surface roughness or smoothness, particle-particle flowability, blocking temperature, melt flow rheology, chargability, conductivity, and the like characteristics.

The present invention provides, in embodiments, flood feed free radical polymerization processes which can conveniently afford well defined larger sized aggregated resin particles, greater than, for example, about 0.5 microns, for example, from about 1 to about 20, and preferably from about 1 to about 10 microns, and which resin particles are believed to arise from concurrent surfactant-free monomer polymerization and controlled particle aggregation.

The aforementioned and other advantages are achievable with the resin particles compositions and processes of the present invention. The compositions and processes of the present invention are useful in many applications including printing, for example, ink jet and electrostatographic such as in xerographic printers and copiers, including digital systems.

PRIOR ART

U.S. Pat. No. 5,219,943, issued Jun. 15, 1993, and U.S. Pat. No. 4,935,469, issued Jun. 19, 1990, both to Akasaki et al., disclose processes for producing mondispersed fine particles of a vinyl polymer comprising polymerizing monomers containing at least one vinyl monomer, and a methacrylic ester in the presence of a surface active agent, a persulfate polymerization initiator, and a divalent metal as an electrolyte. Monodispersed vinyl polymer fine particles having a particle size of one micrometer or greater with a very narrow size distribution can be obtained.

U.S. Pat. No. 5,455,315, commonly owned and assigned, issued Oct. 3, 1995, to Paine et al., discloses an in situ process for the preparation of resin particles comprising: preparing a seed particle latex by aqueous emulsion polymerization of a first mixture comprised of at least one monomer, an optional chain transfer agent, and a water soluble free radical initiator, wherein the reaction of the free radical initiator and monomer produces oligomeric radicals which provide in situ stabilization to the resulting first generation seed particles; optionally diluting the first seed particle latex with water; heating and starve feed adding to the first generation seed particles a second mixture comprised of at least one monomer, an organic soluble free radical initiator, an optional chain transfer agent, an optional water soluble free radical initiator, and an optional surfactant to form a third mixture comprised of second generation seed particles; heating and starve feed adding to the second generation seed particles additional said second mixture to form a fourth mixture comprised of third generation seed particles; heating and starve feed adding to the third generation seed particles additional said second mixture to form a fifth mixture comprised of fourth generation seed particles; and heating and starve feed adding to the fourth generation seed particles additional said second mixture to form a sixth mixture comprised of fifth generation seed particles.

The aforementioned patents are incorporated in their entirety by reference herein.

There remains a need for an inexpensive, efficient, and environmentally acceptable methods for the preparation of resin particles with, for example, well defined particle size and size distribution properties, and imaging processes thereof.

SUMMARY OF THE INVENTION

Embodiments of the present invention, include:

overcoming, or minimizing deficiencies of prior art processes, by providing semi-continuous emulsion polymerization processes;

providing continuous emulsion polymerization processes comprising adding a mixture of at least one free radical reactive monomer continuously to a heated aqueous solution of a water soluble free radical initiator and a water soluble salt to form latex emulsion particles and aggregates thereof; and wherein the rate of continuous addition of the monomer is greater than the rate at which monomer is consumed by polymerization;

providing continuous emulsion polymerization processes wherein resin particle growth and resin particle aggregation controllably occur simultaneously to afford particulate products with well defined particle size and size distribution properties;

continuous emulsion polymerization processes wherein flood feeding of the monomer or monomers to the polymerization reaction mixture overcomes the nucleation limiting 0.5 micron particle size barrier;

providing polymerization processes wherein the total number of resin particles, for example, seed particles initially formed in the nucleation stage and their progeny, can be chemically compelled to continuously decrease (in number) over the course of the monomer polymerization via controlled resin particle aggregation phenomena with the result that monodisperse resin particles and resin particle aggregates thereof, on the order of from about 1 to about 3 microns, can be obtained in a single step;

providing polymerization processes wherein the resulting resin particles or resin particle aggregates can optionally be grown to larger particle sizes by a subsequent monomer addition stage or stages; and providing polymerization processes wherein the resulting resin particles or resin particle aggregates thereof can optionally be colored either during or after particle formation and aggregation to provide colored particles which are useful in dry and liquid marking materials.

DETAILED DESCRIPTION OF THE INVENTION

Figure 1:
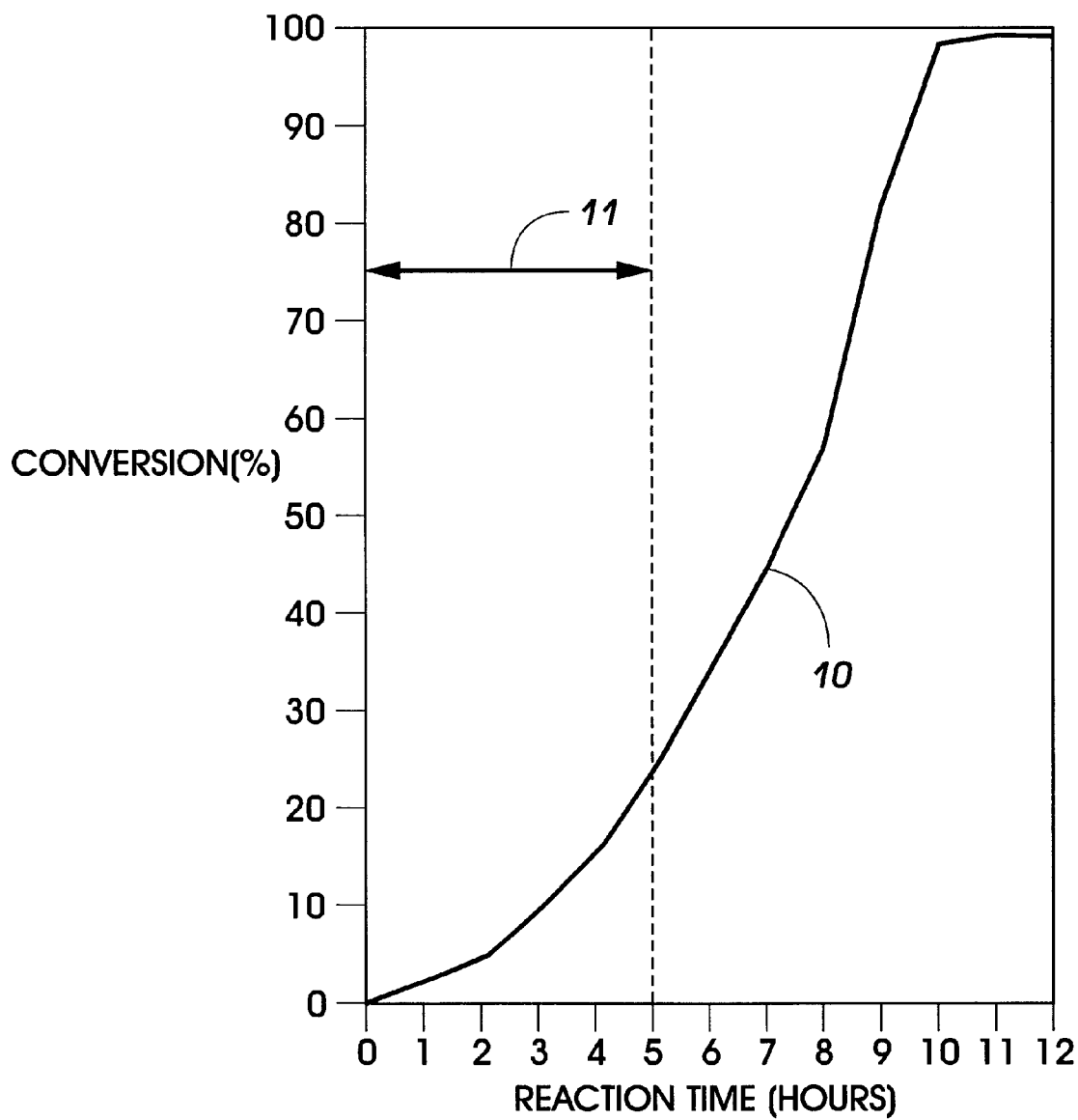
FIG. 1 is an exemplary plot of the monomer to polymer conversion versus time.

The composition and processes of the present invention provide, in embodiments: emulsifier free emulsion polymerization processes; monodisperse resin particles or resin particle aggregates within a narrow average diameter size range; monodisperse resin particles or resin particle aggregates with geometric particle size distributions well below about 1.05, for example, of from about 1.01 to about 1.02, and $d_w/d_n$ values less than about, or equal to about 1.01; resin particles and particle aggregates which can be readily colored and suitable for use in dry and liquid developers and toner for printing applications; and resin particles and resin particle aggregates which can be grown, if desired, to larger average particle sizes.

In embodiments, the present invention provides a process for the preparation of resin particles comprising:

adding a mixture of at least one free radical reactive monomer continuously to a heated aqueous solution of a water soluble free radical initiator and a water soluble salt to form latex emulsion particles and aggregates thereof; and wherein the rate of continuous addition of the monomer is preferably greater than the rate at which monomer is consumed by polymerization.

The free radical reactive monomers can be, for example, styrene compounds, vinyl aromatic compounds, conjugated and unconjugated diene compounds, acrylates with, for example, from 4 to about 25 carbon atoms, alkacrylates with, for example, from 5 to about 25 carbon atoms, cyanoacrylates, vinyl acetates, and the like monomers, and mixtures thereof. Examples of suitable monomers include vinyl monomers such as styrene, p-chlorostyrene, butadiene, isoprene, and myrcene; vinyl acids, vinyl esters of monocarboxylic acids including methyl acrylate, n-octyl acrylate, phenyl acrylate, methyl methacrylate, and butyl methacrylate; methacrylonitrile, and the like.

In embodiments, one or more free radical reactive monomer, or monomers are selected, for example, from 1 to about 10, and preferably from 2 to about 5, in embodiments, free radical reactive monomers can be selected. In other embodiments, for example, where an acrylate containing copolymer is desired, at least one monomer is an acrylate compound with from 3 to about 30 carbon atoms in an amount of from about 1 to about 90, and preferably from about 20 to about 60 weight percent based on the total weight of the monomers selected.

In embodiments, the present invention can further comprise including in amounts of, for example, from about 0.5 to about 5 weight percent of a free radical polymerizable organic acid monomer along with the added monomer in an amount of from about 0.1 to about 10, and preferably, of from about 0.2 to about 5 weight percent of the total monomer polymerized. A preferred free radical polymerizable organic acid monomer is a vinyl carboxylic acid compound with from 3 to about 30 carbon atoms, and preferably the vinyl carboxylic acid compound is an acrylic acid monomer compound with from about 3 to about 8 carbon atoms. For example, acrylic acid, of the formula $CH_2=CH-CO_2H$, and vinyl carboxylic acid compounds of the formula $R^1R^2C=CR^3-CO_2H$, where $R^1$, $R^2$ and $R^3$ independently are hydrogen or alkyl containing substituents with from 1 to about 5 carbon atoms. Although not wanting to be limited by theory, it is believed that the inclusion of an organic acid monomer acts as a pseudo surface active agent but which compound is substantially incorporated, by polymerization, into to the resin particle product. The inclusion of the vinyl carboxylic acid compound, such as an acrylic acid compound, markedly reduces the occurrence or appearance of coagulum and further produces narrower particle size distributions than when the vinyl carboxylic acid compound is excluded from the process.

Water soluble free radical initiator compound examples in amounts for example, of from about 0.1 to about 10 weight percent based on the total weight of monomer polymerized, are peroxides, peroxydisulfates, azo compounds, such as sodium persulfate; potassium persulfate; ammonium persulfate; hydrogen peroxide; t-butyl hydroperoxide; cumene hydroperoxide; para-methane hydroperoxide and peroxy carbonates; 4,4'-azobis(4-cyanovaleric acid); 1,1'-azobis(1-methylbutyronitrile-3-sodium sulfonate); 2,2'-azobis(2-amidinopropane)dihydrochloride; 2,2'-azobis(2-amidinopropane)dihydrochloride; 2,2'-azobisisobutyl amide dihydrate; 2,2'-azobis[2-(2-imidazolin-2-yl)propane]dihydrochloride; 2,2'-azobis[2-(5-methyl-2-imidazolin-2-yl)propane]dihydrochloride; and the like compounds, and mixtures thereof.

Addition of the monomer or monomer mixture to the dissolved free radical initiator compound produces intermediate oligomeric products which are believed to provide partial stabilization of incipient resin particles against precipitation or aggregation.

The water soluble salt compounds present for example, of from about 0.1 to about 10 weight percent based on the total weight of monomer polymerized, can be any Group IA and IIA metal halides, metal carbonates and bicarbonates, phosphates, sulfates, hydroxides, and mixtures thereof, for example, sodium salts of chloride, carbonate, bicarbonate, phosphate, dihydrogen or biphosphate, hydrogen phosphate, sulfate, bisulfate, hydroxide, and the like and mixtures thereof. Specific water soluble salts include sodium chloride, sodium bicarbonate, potassium hydroxide, potassium chloride, and the like salts. The water soluble salt compound is preferably freely dissociable in water and water-cosolvent mixtures and is capable of providing buffering action or capacity to the polymerization reaction mixture, for example, capable of maintaining a relatively constant pH in the polymerization reaction mixture even in the presence of acidic or basic ingredients or by way of the appearance of disappearance of acidic or basic components during the course of the polymerization or resulting from deliberate addition of additives. Thus, during the addition of monomers the polymerization mixture has a pH of from about 2 to about 12, and an ionic strength of from about 0.02 to about 4 moles per liter. In embodiments, the pH is preferably from about 2 to about 8.5 and thereby preferentially provides monodisperse monomodal resin particles, and a pH of preferably from of from about 9 to about 14 preferentially provides bimodal resin particle distributions.

In embodiments, the present invention can further comprise including a chain transfer agent along with the added monomer for the primary purpose of controlling or manipulating the molecular weight distribution of the resulting polymer products. Suitable chain transfer compounds in amounts, for example, of from about 0.1 to about 10 weight percent based on the total weight of monomer polymerized, include dodecanethiol, butanethiol, isooctyl-3-mercaptopropionate 2-methyl-5-t-butylthiolphenol, carbon tetrabromide, carbon tetrabromide, and the like compounds, and mixtures thereof.

In embodiments of the present invention, the latex emulsion can be formed without an added surfactant or emulsifier compound, with no apparent negative compromise to the stability of the particles or efficacy of the process. The absence of a surfactant or emulsifier compound and the emulsion stabilization afforded thereby in the present process is apparently partially compensated for by the aforementioned intermediate oligomeric radical compounds, and thereby provides the additional advantage that there is no need for an separate surfactant removal step, for example, a washing or rinsing step, to remove the surfactant or emulsifier material. The absence of a surfactant in the final product is particularly preferred where the resin particle products are desired, for example, for humidity insensitive or charge sensitive marking materials, such as dry and liquid toner compositions.

The latex emulsion can be formed with continuous stirring at a rate, for example, of about 100 to about 500, preferably from about 100 to about 300 revolutions per minute. Lower or slower stirring rates may be disfavored when the stirring rate limits the rate of polymerization or the access of monomer to the growing polymer chains. Also, higher stirring rates may not offer any apparent advantages in achieving the particles and particle properties of the present invention. Heating the polymerization reaction can be accomplished by any suitable means in a suitable period, for example, from about 1 hour to about 24 hours, and at a suitable temperature of, for example, from about 50 to about 120° C. Polymerization reaction temperatures of about 60 to about 80° C. are preferred for achieving the particles size and distribution properties as illustrated herein, whereas higher reaction temperatures can provide shorter reaction times, for example, of from about 5 to about 10 hours, they may be compromised by resin particle products with higher particle size and particle size distribution properties.

The continuous addition of monomers can be accomplished at an effective rate of, for example, from about 0.4 grams to about 25 grams per kilogram of reactor content per minute, and preferably in embodiments, from about 1.5 grams per minute per kg of reactor contents at the start of monomer feeding to about 1.05 grams per minute per kg of reactor content at or approaching the end of monomer feeding. The continuous addition of monomers is preferably at a rate which is greater than the rate of consumption of the monomer by the polymerization reaction to insure that an excess of monomer is preferably usually present in the polymerization reaction mixture throughout most of the polymerization process. This situation provides for a continuously decreasing particle number along with simultaneous particle size growth throughout the polymerization process thereby enabling an important means for controlling important particle properties, such as, size, size distribution, and degree of aggregation. The resin particles have, in embodiments, a volume median diameter of from about 0.5. to about 10 microns, preferably from about 1 to about 5 microns, and more preferably a diameter of from 1 to about 3 microns, and low polydispersity or geometric size distribution (GSD) properties of from, for example, about 1.001 to about 1.05. and the ratio of particle diameter weight to particle diameter number $d_w/d_n$ of from about 1.001 to about 1.10.

In embodiments, the present invention may further comprise isolating, washing, and drying the resulting particles. The solids content of latex can relatively high and from about 10 to about 40 weight percent of the polymerization mixture. The resulting resin particles can have a glass transition temperature ($T_g$) of, for example, from about 40 to about 90° C., and which resin particles are particularly desirable for use in toner compositions. Toner compositions of the present invention can comprise resin particles prepared by the present process, and optional additives selected from the group consisting of colorants, charge control additives, flow aids, lubricants, and mixtures thereof. The colorant can be, for example, pigments, dyes, magnetite, carbon black, surface treated derivatives thereof, and mixtures thereof.

The present invention further embodies an imaging process comprising:
   forming colored particles, for example forming resin particles in accordance with the present invention, and coloring the resin particles either during or subsequent to the polymerization of monomers; and
   depositing the colored particles onto a receiving member, wherein a printed image results. The deposition of the colored particles onto a receiving member can be accomplished, for example, electrostatographically, magnetographically, ionographically, and subsequent to suspending the colored particles in an appropriate liquid vehicle, jetting the liquid onto the receiver by various known methods.

The present invention, in embodiments, encompasses developer compositions comprised of coated carrier particles comprising a core with a coating thereover comprised of at least one polymer, and a toner composition comprised of toner resin particles and a colorant, especially pigment particles.

Coloration of the resin particles afforded by processes of the present process are disclosed, for example, in the aforementioned commonly owned and assigned, U.S. Pat. No. 5,455,315, the disclosure of which is incorporated herein in its entirety, reference for example, col. 14 lines 5 to 35, and col. 6 lines 40 to 48.

In the toner compositions, the resin particles are present in a sufficient but effective amount, for example from about 70 to about 90 weight percent. Thus, when 1 percent by weight of the charge enhancing additive is present, and 10 percent by weight of pigment or colorant, such as carbon black, is contained therein, about 89 percent by weight of resin is selected. Also, the charge enhancing additive may be coated on the pigment particle. When used as a coating, the charge enhancing additive is present in an amount of from about 0.1 weight percent to about 5 weight percent, and preferably from about 0.3 weight percent to about 1 weight percent.

Numerous well known suitable colorants, such as pigments or dyes can be selected as the colorant for the toner particles including, for example, carbon black like REGAL 330®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

When the pigment particles are comprised of magnetites, thereby enabling single component toners in some instances if desired, which magnetites are a mixture of iron oxides ($FeO.Fe_2O_3$) including those commercially available as MAPICO BLACK®, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK®, in an amount of, for example, from about 5 to about 60, and preferably from about 10 to about 50 weight percent can be selected.

Colorant includes pigments, dyes, mixtures thereof, mixtures of pigments, mixtures of dyes, and the like.

There can also be blended with the toner compositions external additive particles including flow aid additives, which additives are usually present on the surface thereof. Examples of these additives include colloidal silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 10 percent by weight, and preferably in an amount of from about 0.1 percent by weight to about 5 percent by weight. Several of the aforementioned additives are illustrated in U.S. Pat. Nos. 3,590,000 and 3,800,588, the disclosures of which are totally incorporated herein by reference.

With further respect to the toners used in conjunction with the present invention, colloidal silicas, such as AEROSIL®, can be surface treated with the charge additives in an amount of from about 1 to about 30 weight percent and preferably 10 weight percent followed by the addition thereof to the toner in an amount of from 0.1 to 10 and preferably 0.1 to 1 weight percent.

Also, there can be included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K.K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442,835, the disclosure of which is totally incorporated herein by reference.

The low molecular weight wax materials are optionally present in the toner composition or the polymer resin beads of the present invention in various amounts, however, generally these waxes are present in the toner composition in an amount of from about 1 percent by weight to about 15 percent by weight, and preferably in an amount of from about 2 percent by weight to about 10 percent by weight and may in embodiments function as fuser roll release agents.

Encompassed within the scope of the present invention are colored toner and developer compositions comprised of toner resin particles, carrier particles, charge enhancing additives, and as pigments or colorants red, blue, green, brown, magenta, cyan and/or yellow particles, as well as mixtures thereof. More specifically, with regard to the generation of color images utilizing a developer composition with charge enhancing additives, illustrative examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference particles used the aforementioned coating composition, the coating generally containing terpolymers of styrene, methylmethacrylate, and a silane, such as triethoxy silane, reference U.S. Pat. Nos. 3,526,533, 4,937,166, and 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 175 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner composition used in conjunction with the coated carriers of the present invention can be prepared by a number of known methods as indicated herein including the toner resin particles, pigment particles or colorants, and a charge enhancing additive. Also, as indicated herein the toner composition without the charge enhancing additive in the bulk toner can be prepared, followed by the addition of charge additive surface treated colloidal silicas.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

The toner compositions are usually jetted and classified subsequent to preparation to enable toner particles with a preferred average diameter of from about 5 to about 25 microns, more preferably from about 8 to about 12 microns, and most preferably from about 5 to about 8 microns. Also, the toner compositions preferably possess a triboelectric charge of from about 0.1 to about 2 femtocoulombs per micron as determined by the known charge spectrograph. Admix time for toners are preferably from about 5 seconds to 1 minute, and more specifically from about 5 to about 15 seconds as determined by the known charge spectrograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Also, the toner compositions, in embodiments, of the present invention possess desirable narrow positive or negative charge distributions, optimal charging triboelectric values, preferably of from about 10 to about 40, and more preferably from about 10 to about 35 microcoulombs per gram as determined by the known Faraday Cage methods with from about 0.1 to about 5 weight percent in one embodiment of the charge enhancing additive; and rapid admix charging times as determined in the charge spectrograph of less than 15 seconds, and more preferably in some embodiments from about 1 to about 14 seconds.

The invention will further be illustrated in the following non limiting Examples, it being understood that these Examples are intended to be illustrative only and that the invention is not intended to be limited to the materials, conditions, process parameters, and the like, recited herein. Parts and percentages are by weight unless otherwise indicated.

Chemicals

Reagent-grade styrene and butyl acrylate monomers were purchased from the Aldrich Chemical Company and used without further purification. Analytical-grade ammonium persulfate, and all the salts used were also purchased from the Aldrich Chemical Company and used as received. Deionized water was used throughout.

Synthesis of Lattices

The styrene/butyl acrylate (80/20 relative weight ratio) latices were prepared by a semi-continuous procedure. The polymerizations were carried out in a four necked 1-L reactor equipped with a condenser, stirrer, thermometer, and nitrogen inlet. The reactor was thermostated at 70° C. in a water bath. Agitation was kept constant at 200 RPM. A slow nitrogen purge was maintained throughout the polymerization at a slow rate to exclude oxygen and minimize evaporation.

Latex Characterization

Particle sizes larger than 1.5 micron were characterized using a 256 channel Coulter Multisizer II, while smaller particles were measured with an ICI-Joyce Loebl Disk Centrifuge equipped with a photodetector and supported by a Brookhaven Instruments DCP-1000 Data System. In the former case the latex was dispersed into Isoton II™ solution, while in the latter, the spin fluid and dilution solvent for latices was 80/20 water/methanol by weight. All samples were sonicated for 15 minutes in an ultrasonic water bath (Branson-2200) prior to the measurements. Particle size and uniformity, as well as the particle shape and particle surface morphology were confirmed by both Scanning Electron Microscopy (SEM) and Transmission Electron Microscopy (TEM). The Scanning Electron Microscope was an Hitachi S-570. The measurements were performed at an accelerating voltage of 15 keV. The samples were adhered and dried on aluminum sample holders and coated with gold prior to viewing. When looking for secondary particle populations, it was found that the edge of the sample was the best place to examine. The Transmission Electron Microscopy measurements were made using a Philips 300 TEM. The latexes were prepared for analysis by dilution to 0.1% solids and then adhered onto Formvar coated copper grids. These were then dried and subjected to RuO4 vapors (0.5% wt aqueous solution, from Polysciences) for less than two minutes. More than 300 particles per grid were counted. Surface tension was measured with a Cenco-DuNuoy Interfacial Tensiometer using the ring method.

The initial pH of the aqueous phase, just before starting the monomer feeding, and the final pH of the reaction mixture were always measured. In some Examples the pH was monitored throughout the reaction as well.

The cumulative monomer conversions were determined gravimetrically. Samples of approximately 2 mL were removed from the reaction mixture at different times, diluted with 2 mL saturated hydroquinone solution, weighed into tared aluminum pans and dried at 70° C. to a constant weight.

The percentage conversion was obtained from the dried solids content by the following formulas:

$$\text{Conversion} = \frac{\text{Reacted monomer from } t=0 \text{ to } t}{\text{Total monomer to be added}}$$
$$= \frac{V(t)\,SOC(t) - V(0)\,SOC(0)}{Ra\,t_F}$$

wherein:

SOC(0) is the solids content at time t=0, [g solids/mL latex];

$t_F$ is the time at the end of the monomer addition, [min.];

Ra is the monomer addition rate, [g/min.];

V(t) is the reaction volume at time t; [mL]: V(t)=V(0)+Ra t; and

V(0) is the initial reaction volume, [mL], just before starting the monomer addition.

The particle number density, Np, was determined from the solids content and the average particle diameter, as follows:

$$Np(t) = \frac{6 \times 10^{21} SOC(t)}{dw3(t)\rho}$$

wherein:

SOC(t) is the solids content at time t, [g solids/mL latex];

$\rho$ is the polymer density; $\rho$=1.05 [g/mL];

dw(t) is the weight average particle diameter, [nm]; and

Np(t) is the p article number density, [number of particles/mL latex].

EXAMPLE I

A monomer feed mixture was prepared by mixing styrene (160 grams), n-butylacrylate (40 grams) and acrylic acid (4 grams) under nitrogen. Water (400 grams) was charged into the reactor at 70° C. and sodium chloride (1.0 grams) and sodium bicarbonate (0.93 grams) added. The solution was purged with nitrogen for approximately 1 h to eliminate the dissolved oxygen. Ammonium persulfate (1.2 grams) was dissolved in 50 grams nitrogen-purged water and added to the reactor under nitrogen. The reaction mixture was allowed to re-equilibrate thermally for 10 minutes. The monomer mixture was fed into the reactor continuously by means of an FMI QSY-1 piston pump at a rate of 0.68 grams per minute and a total feeding time about 5 hours. After completing the monomer addition, the reaction was continued for 7 hours, for a total of 12 hours. The latex was cooled and filtered through glass wool to remove any coagulum formed. The product of Example I was a monodisperse latex with size polydispersity of dw/dn=1.013, and solids content of 31.5 weight percent.

Although not wanting to be limited by theory, it is believed that the monomer feed is in an excess or "flood" situation relative to the rate of polymerization of monomer, and is not believed to be a "starve" feed condition as previously disclosed, reference for example, the aforementioned commonly owned and assigned U.S. Pat. No. 5,455,315. It is also readily understood by one of ordinary skill in the art that the feed rate can be an important process control variable in these and related polymer particle formulation processes.

Important aspects of the monomer flooded emulsion polymerization process (MFEP) are illustrated in the Figures which show the results from latex analysis of samples removed from the reactor during the polymerization described above. The Figures taken together illustrate salient features of the MFEP process: monomer addition at a rate faster than the polymerization rate(flood condition) causes particle aggregation during polymerization, reducing the particle count and increasing the final particle size.

FIG. 1 shows the monomer conversion, measured gravimetrically, with respect to time and wherein reference numerals 10 and 11 represent respectively, the measured relationship and the monomer addition period in hours. FIG. 1 illustrates the monomer flooded characteristic of the system: conversion of monomer to polymer is slower than monomer addition. As a result, the concentration of unreacted monomer builds up during the addition period. It is noteworthy that within a typical five hour addition period for complete monomer addition, that is, wherein all (100 percent) of the monomer has been added, there is observed about 20 percent monomer to polymer conversion, in the case of Example I. The desired range of polymerization during the addition period is form about 10% to about 80%. If there is less polymerization, it is unlikely to be a stable system; if there is more polymerization, then less aggregation can occur during the monomer addition period, and the final particle size will be smaller, for example, sometimes less than 1 micron.

Figure 2:
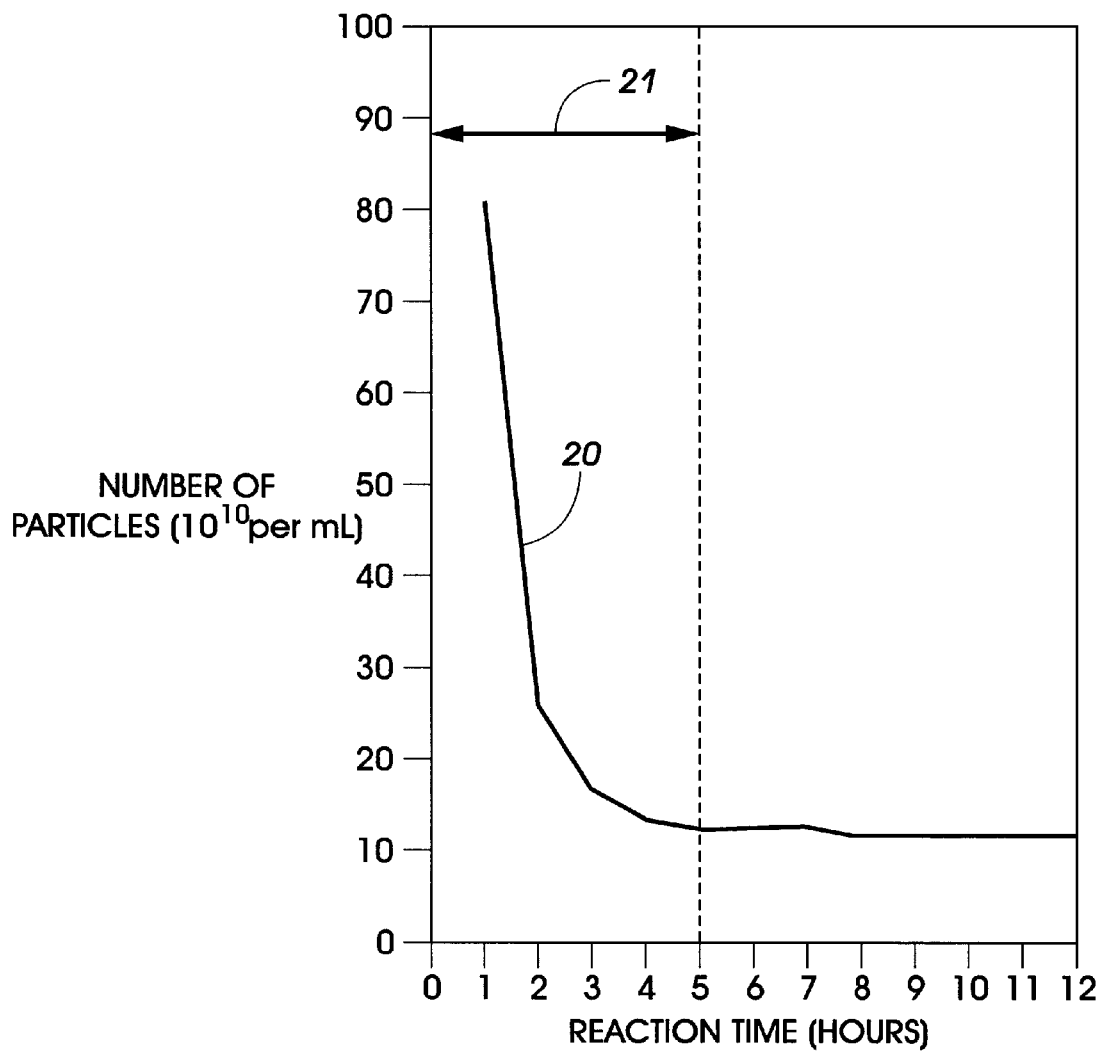
FIG. 2 is an exemplary plot of the particle count versus reaction time.

FIG. 2 illustrates, in embodiments, the particle density or total particle count, or number of particles per mL, which is computed from the conversion and particle size as described above, with respect to time and wherein reference numerals 20 and 21 represent respectively, the measured relationship and the monomer addition period in hours. The graph shows that the total number of resin particles, that is, those particles initially formed during particle nucleation, decrease in number with time which is highly suggestive of the aforementioned continuous aggregation phenomena. The particle count decreases substantially during the monomer addition period. This occurs because of particle aggregation during this period, which lowers the particle count and increases the final particle size with the result that substantially all of the monomer is polymerized into fewer particles. In Example I, the particle count decreases to about 14% of the earliest measured value. The amount of aggregation occurring during polymerization depends on the monomer addition rate, thus for example, faster addition provides more agglomeration as the particles are somewhat less stable, and other factors, such as temperature and ionic strength. The effect of temperature is mainly on the rate of initiation: higher temperature means faster polymerization, more nuclei and smaller final particle sizes. Ionic strength affects the aggregation: higher ionic strength causes more aggregation and larger final particle size. Favorable results with final particle sizes of from about 1 to about 10 micron size range can be achieved.

Figure 3:
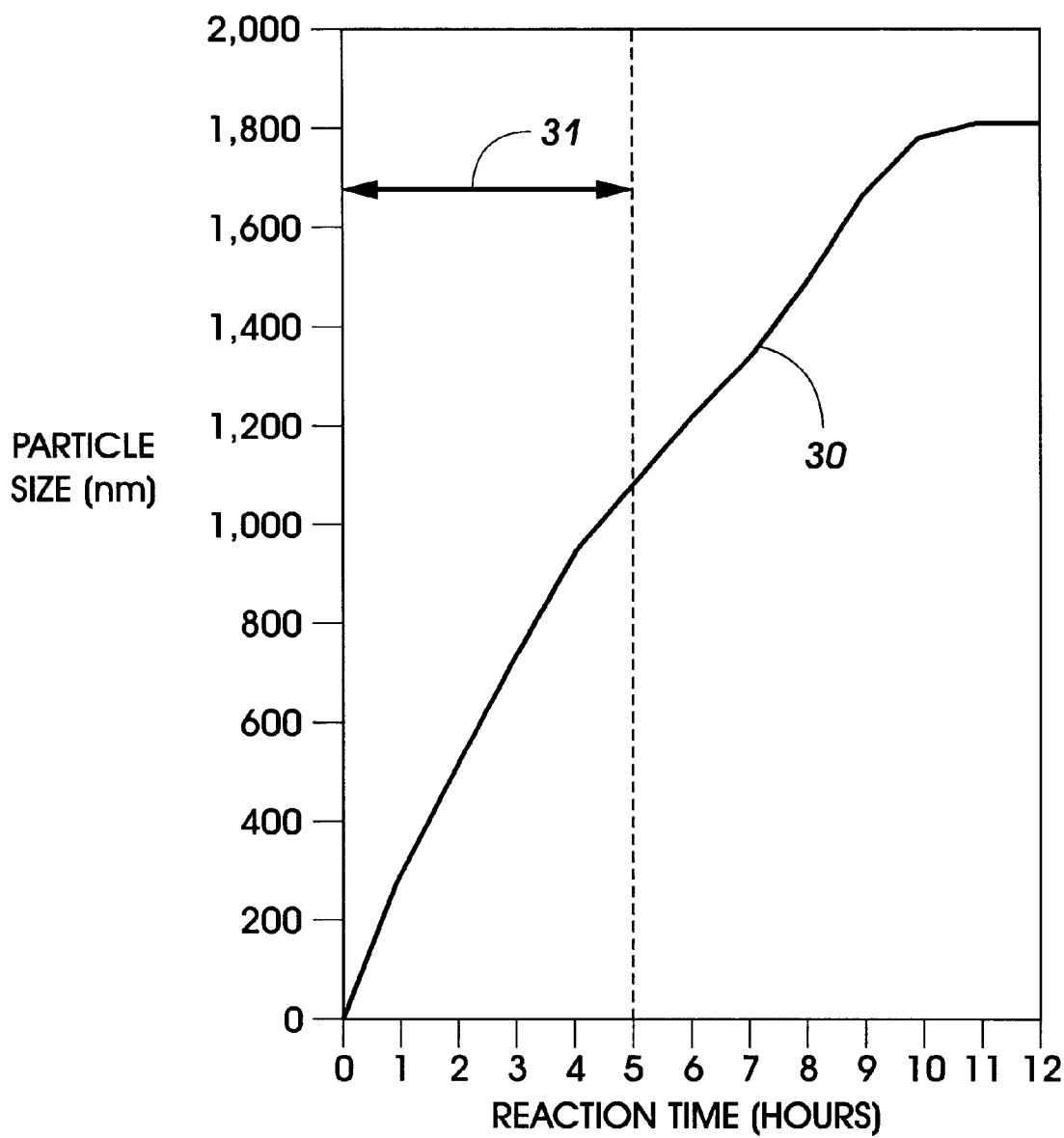
FIG. 3 is an exemplary plot of particle size versus reaction time.

FIG. 3 shows, in embodiments, the latex particle size, measured by Coulter Multisizer or disc centrifuge versus reaction time for the polymerization and wherein reference numerals 30 and 31 represent respectively, the measured relationship and the monomer addition period in hours. The indicated apparent linear growth of particle size up until a constant particle size (plateau) is reached and well after monomer addition has been concluded, taken together with the aforementioned decreasing particle number results support the proposition that simultaneous particle growth and particle aggregation is occurring in polymerization-resin particle formation processes of the present invention. FIG. 3 also shows that the particle size increases relatively continuously during the polymerization reaction, and plateauing at about 1,785 nm (1.785 microns), for example, as in Example I. Particle formation occurs early, within the first 10 to 30 minutes in typical reactions. The rate of particle size increase can be controlled by the addition rate of monomer, faster addition gives faster growth, and by the ionic strength, contributed to by persulfate initiator and added salt, so that higher ionic strength gives larger particles.

EXAMPLE II

A monomer feed mixture was prepared by mixing styrene (160 grams) and n-butylacrylate (40 grams) under nitrogen. Water (400 grams) was charged into the reactor at 70° C. and sodium chloride (0.65 grams) added. The solution was purged with nitrogen for approximately 1 hour in order to eliminate the dissolved oxygen. Ammonium persulfate (1.2 grams) was dissolved in 50 grams nitrogen-purged water and added to the reactor under nitrogen. The reaction mixture was allowed to re-equilibrate thermally for 10 minutes. The monomer mixture was fed into the reactor continuously by means of an FMI QSY-1 piston pump over a period of 5 hours (0.67 grams per minute). The stirring speed was adjusted to a rate which would draw the monomer into dispersion (about 200 RPM). The monomer conversion during the 5 hour feeding time was measured to be 20%. Higher levels of conversion can be achieved during the monomer addition period, for example, by selecting different salts (Table 1). After completing the addition, the reaction was allowed to continue a further 7 hours, for a total time of 12 hours. The latex was cooled and filtered through glass wool to remove any coagulum formed.

The final monodisperse particle size measured by Coulter Multisizer was 2.71 microns, with $d_w/d_n=1.014$ (see Table 1). Examples III and IV employed similar reaction conditions, varying only the salt added. Example V shows the result without adding salt. In all cases, the flooded conditions are indicated by the low conversion after 5 hours of monomer feeding time.

TABLE 1

| | Example II | Example III | Example IV | Example V |
|---|---|---|---|---|
| Salt Used [wt. in grams] | NaCl [0.65] | NaHCO$_3$ [0.93] | NaOH [0.90] | None |
| Initial pH | 3.1 | 7.5 | 10.9 | 3.0 |
| Conversion after 5 hours feeding | 20% | 20% | 43% | 36% |
| Particle Size ($d_w$ in microns) | 2.71 | 2.23 | 0.62 | 0.72 |
| $d_w/d_n$ | 1.014 | 1.014 | 1.026 | 1.006 |

Examination of the data in Table 1 reveals that, in addition to the monomer flooded requirement, two other conditions promote large monodisperse particles of final size greater than one micron: First, the pH should be less than about 8.6, and second, the addition of an ionizable salt. The pH effect occurs because above pH of about 8.6, secondary particle formation occurs during polymerization, increasing the particle count temporarily. This reduces the final particle size, but as Example IV shows, the final particle size distribution remains relatively monodisperse. If salt is not added, as in Example V, there is less particle aggregation during polymerization, and the final size is smaller. In the absence of salt, the initial pH is acidic, less than 7, because of bisulfate formed by the decomposition of some persulfate initiator prior to starting the monomer feed.

EXAMPLE VI

A monomer feed mixture was prepared by mixing styrene (160 grams), n-butylacrylate (40 grams) and acrylic acid (1 gram) under nitrogen. Water (400 grams) was charged into the reactor at 7° C. and sodium bicarbonate (3.72 grams) added. The solution was purged with nitrogen for approximately 1 hour to eliminate the dissolved oxygen. Ammonium persulfate (1.2 grams) was dissolved in 50 grams nitrogen-purged water and added to the reactor under nitrogen. The reaction mixture was allowed to re-equilibrate thermally for 10 minutes. The monomer mixture was fed into the reactor continuously by means of an FMI QSY-1 piston pump at a rate of 0.68 grams per minute, for a total feeding time of about 5 hours. After completing the addition, the reaction was allowed to continue for 7 hours, for a total of 12 hours. The latex was cooled and filtered through glass wool to remove any coagulum formed.

Examples VII to XI were performed under similar conditions, with varying amounts of acrylic acid, as shown in Table 2 below. In all cases, the flooded conditions are indicated by the low conversion after 5 hours of monomer feeding time.

TABLE 2

| Example: | XI | VI | VII | VIII | IX | X |
|---|---|---|---|---|---|---|
| Grams of Acrylic Acid | 0 | 1 | 2 | 4 | 8 | 10 |
| Conversion after 5 hr feeding | 27% | 27% | 33% | 46% | 63% | 64% |
| Particle Size ($d_w$ in microns) | 2.82 | 1.89 | 1.30 | 1.20 | 1.01 | 0.96 |
| $d_w/d_n$ | 1.014 | 1.013 | 1.005 | 1.003 | 1.005 | 1.007 |

An advantage of adding from about 0.1 to 4% acrylic acid, based on the total weight of monomer polymerized, resides in the reduction or elimination of from about 1 to 10% coagulum formed in reactions without acrylic acid. The cumulative conversion has comparable values with respect to time, and the particle count values consistently decreased with time, again factors apparently indicating particle-particle aggregation phenomena concurrent with monomer polymerization.

EXAMPLES IX to XIV

These examples were performed under the same conditions as Example I, but using 1.30 grams of sodium chloride and no sodium bicarbonate and are tabulated in Table 3. Note that the largest particle sizes are obtained under the most flooded conditions, that is where there is the least monomer conversion after the end of the monomer feeding period. The effect of increasing the monomer feed time from about 5 to 6 hours, as in Examples IX and XIII to about 17 hours, as in Example IV, results in particle formation processes that more closely resemble the aforementioned starve-feed reaction conditions. Slower, longer monomer feeding intervals result in less aggregation and smaller final average particle sizes. It appears that the extent of particle aggregation that occurs during the polymerization is sensitive to and reflects the presence of the excess monomer present during the aggregative stage and thereby enables the aforementioned operator control over particle size and size distribution properties.

Note that a steady feeding rate in grams per minute of monomer translates into a gradually decreasing feeding rate in grams per minute per kilogram of reactor content due to the increasing weight in the reactor. This example shows steady feeding rate, but it is readily evident to one of ordinary skill in the art that the feeding rate may vary during addition to achieve desired additional elements of control over the final particle size and particle size distribution.

TABLE 3

| Example: | IX | XIII | XIV |
|---|---|---|---|
| Feeding Time in hours | 5 | 6 | 17 |
| Feeding Rate [grams/minute] | 0.68 | 0.57 | 0.20 |
| Initial Feed Rate | 1.51 | 1.26 | 0.44 |
| Final Feed Rate [grams/minute/kg reactor content] | 1.04 | 0.87 | 0.31 |
| Conversion at end of feed time | 36% | 40% | 90% |
| Particle Size ($d_w$ in microns) | 1.45 | 1.38 | 1.06 |
| $d_w/d_n$ | 1.014 | 1.013 | 1.003 |

EXAMPLES XV to XVII

These examples were performed under the same conditions as Example I, but using the amounts of sodium chloride and sodium bicarbonate indicated in Table 4. Again, the smallest sizes are obtained at the lowest salt concentration, while the desirable larger sizes, of from about 1 to about 2 microns, are obtained at higher salt concentrations, and hence higher ionic strength. These particles are all monodisperse and had particle size, particle number density, and conversion versus time curves similar to those shown in FIGS. 1–3.

TABLE 4

| Example: | XV | XVI | XVII |
|---|---|---|---|
| $NaHCO_3$ [grams] | 0.93 | 0.93 | 0.93 |
| NaCl [grams] | 0.0 | 0.65 | 1.00 |
| Conversion at end of feeding | 23% | 31% | 32% |
| Particle Size ($d_w$ in microns) | 0.94 | 1.27 | 1.79 |
| $d_w/d_n$ | 1.004 | 1.003 | 1.013 |

Other modifications of the present invention may occur to one of ordinary skill in the art based upon a review of the present application and these modifications, including equivalents thereof, are intended to be included within the scope of the present invention.

What is claimed is:

1. A toner composition comprising resin particles prepared by the process comprising: adding a mixture of at least one free radical reactive monomer continuously to a heated aqueous solution of a water soluble free radical initiator and a water soluble salt to form latex emulsion particles and aggregates thereof; wherein the rate of continuous addition of the monomer is greater than the rate at which monomer is consumed by polymerization and optional additives selected from the group consisting of colorants, charge control additives, flow aids, lubricants, and mixtures thereof.

2. An imaging process comprising:

providing a toner composition comprising colored resin particles in accordance with claim 1; and depositing the colored particles onto a receiving member, wherein a printed image results.

3. A toner composition in accordance with claim 1, wherein the resin particles have a volume median diameter of from about 0.5 to about 10 microns.

* * * * *